Patented June 16, 1942

2,286,995

UNITED STATES PATENT OFFICE 2,286,995

PURIFICATION OF ACETIC ACID

Joseph S. Reichert, Arthur Alexander Elston, and Roy Arthur Secord, Niagara Falls, N. Y., assignors to E. I. du Pont de Nemours & Company, Wilmington, Del., a corporation of Delaware No Drawing. Application August 11, 1939, Serial No. 289,694

12 Claims. (Cl. 260—541)

This invention relates to a process for the purification of acids. More particularly, it relates to the purification and decolorization of crude acetic acid.

Crude acetic acid as prepared commercially usually contains various dark colored impurities. These dark colored impurities are more pronounced in the case of crude acetic acid prepared by processes involving the distillation of wood, such as are used commercially for the production of the so-called pyroligneous acid. Crude acetic acid so prepared frequently contains tar-like matter and other impurities which are not readily separated therefrom by simple distillation or other treatment. While not restricted to the purification and decolorization of acids produced by the distillation of wood, our process is particularly applicable for the decolorization of crude acetic acid secured commercially in this manner.

In the past, various methods for removing the tar-like compounds and for decolorizing crude acids, particularly crude acetic acid, have been employed with varying degrees of success. One of the more satisfactory methods used to some extent involved treating the raw starting product with an organic solvent, recovering the crude acid from the solvent, then adding an agent such as potassium permanganate to the crude acid, and finally subjecting the mixture to fractional distillation. By this method, however, only a comparatively small amount of the distillate is of the desired water-white color. In order to secure a greater yield of the substantially water-white product, a product desirable for commercial sale, it had been usual to subject the off-color fractions of this distillate to further treatments. Such further treatments were expensive and slow, and were open to the distinct objection that the yield of water-white acetic acid in any event remained very low.

It is accordingly an object of the present invention to provide an improved method for the production of refined acids, particularly refined acetic acid, frm crude sources for such acids such as crude acetic acid. The attainment of this object includes the ancillary object of developing a process which will greatly increase the yield of the desired water-white acetic acid over the yields now secured by processes known in the industry. These aims may be generally stated to be directed to the end of developing a process for the decolorization of crude acetic acid and other acids which is markedly superior to any process previously known or practiced. These and still further objects of our invention will be apparent from the ensuing disclosure of a preferred method for carrying out our improved decolorization process.

We have found that crude acids, particularly crude acetic acid, may be decolorized and freed from objectionable impurities of a dark colored nature if the crude acid is treated with one or more of those compounds which are chemically termed the "monoper- acids." We have found that both organic and inorganic monoper- acids are suitable for use in our decolorization process, and that the use of acids of either chemical class constitutes a distinct improvement over the methods now known in the industry for decolorizing crude acids.

The monoper- acids may be added to the crude acid to be decolorized and refined, either as such, or in the form of chemical agents which will react in the crude acid to form the monoper- acid in situ. Thus the monoper- acid may be formed outside of the crude acid and then added to the latter, or there may be introduced into the crude acid a chemical compound or compounds which will form the monoper- acid by reaction in the crude product being treated.

The monoper- acids constitute a class of acids which are chemically characterized by the presence of the perhydroxyl grouping OOH as part of the molecule. These monoper- acids may be regarded as derived from other acids, either organic or inorganic, by replacing the hydroxyl group containing the ionizable hydrogen atom of said acids by the perhydroxyl group OOH.

As acids from which the monoper- acids may be derived by the introduction of a perhydroxyl group may be mentioned organic acids of various classes, such as carboxylic organic acids, hydroxy organic acids, and saturated or unsaturated acids, whether those acids be aliphatic or aromatic. Organic acids not characterized by the presence of a carboxyl group, such as the sulfonic acids, either aliphatic or aromatic, may also be mentioned. Acids derived from heterocyclic compounds, such as furoic acid, are also included.

Among aliphatic acids from which monoper- acids suitable for use in our process may be secured by replacement of the hydroxyl group containing the ionizable hydrogen atom by a perhydroxyl group (OOH) may be mentioned monobasic acids such as acetic acid, and dibasic acids such as succinic acid. Among hydroxy acids may be mentioned acids such as lactic acid and glycolic acid. Unsaturated aliphatic dibasic acids such as maleic acid and monobasic acids such as crotonic acid may also be specified.

Among aromatic acids may be mentioned benzoic acid, from which monoperbenzoic acid may be prepared by replacement of the hydroxyl group containing the hydrogen ion by a perhydroxyl group, this monoper- acid being especially suitable for use in our process. Other aromatic acids which may be mentioned are phthalic acid, which yields monoperphthalic acid. Alicyclic organic acids, such as cyclohexane carboxylic acid, may also be utilized to prepare the monoper- acids.

Among sulfonic acids from which monperacids may be prepared may be mentioned acids such as benzene sulfonic acid and naphthalene sulfonic acid. Among heterocyclic acids, nicotinic and quinolinic acids are to be considered.

Among inorganic acids which are suitable for use in our process may be mentioned monopersulfuric acid (Caro's acid) and monoperphosphoric acid. Monoper- acids derived from other inorganic acids such as from carbonic acid, boric acid, etc., are also suitable.

Wherever in this specification or in the appended claims the term "monoper- acid" or "monoper- acids" is utilized, it is intended to include within the scope of that term the acids prepared by replacing the hydroxyl group containing an ionizable hydrogen atom by a perhydroxyl group. This term is intended to cover not only inorganic acids, but organic acids of the various classes known to organic chemistry.

Compounds of this type are well known in the chemical literature, as are methods for preparing them. For example, methods by which the monoper- acids may be prepared from acid starting materials are described in the following publication: d'Ans & Frey, Berichte der deutschen chemischen Gesellschaft, vol. 45, page 1845 (1912).

In practicing our process satisfactory results have been obtained by merely adding a small amount of monperacid to the crude acid to be decolorized and permitting the mixture to stand until decolorization occurs. Thus, a small amount of monoperacetic acid or monopersulfuric acid may be added to crude acetic acid to be decolorized and the mixture permitted to stand for periods of time ranging from one-half hour upwards until decolorization is secured. We have observed that the addition of a monoper- acid in even relatively small amounts to the crude acid to be decolorized results in remarkable improvement in the color of that crude acid, even after relatively short periods of standing, and even in circumstances where the mixture is not subjected to a temperature above room temperature.

Amounts of the monoper- acid comparable to but 0.01% by weight based on the weight of the crude acid have been found effective. However, amounts somewhat greater than this, amounts corresponding to 0.5% or 1% of the monoper- acid based on the weight of the crude acid are prepared for practical commercial operations. In general there is little to be gained by adding over 10% of the monoper- acid, as greater amounts increase the expense without any proportional gain in clarification. The effective range of amounts of monoper- acid suitable may be given as from 0.01% to 10%, the preferred range being from 0.5% to 3%. All these percentages are by weight, based on the weight of the crude acid being treated.

However, in order to secure most rapid decolorization and most efficient clarification, we prefer to distill the mixture of crude acid to be decolorized and monoper- acid. Thus, when the monoper- acid is added to crude acetic acid and the mixture subjected to fractional distillation there is rapidly obtained a high yield of light colored acid of the desired water-white quality. Those particular fractions which are not completely water-white may of course be taken and treated further with additional amounts of monoper- acid in order to convert them to product of the desired crystal-clear character.

When subjecting a mixture of the crude acid to be decolorized and monoper- acid to reflux and distillation, we have observed that the following procedure gives very satisfactory results. To the crude acid to be decolorized there is added a small amount, say approximately 1%, of the monoper- acid selected to accomplish the decolorization. While 1% of the monoper- acid is suitable, amounts below this may of course be utilized, and successful results are attained with amount even as low as 0.05%. Amounts of the monoper- acid in excess of 1% may also be utilized and will give more rapid results, although ordinarily there is no advantage in adding over 15% of the monoper- acid to the crude acid to be decolorized.

After the addition of the desired amount of the monoper- acid, for example peracetic acid, the mixture is now subjected to fractional distillation through a packed column. The rate of distillation is so adjusted that a reflux ratio of approximately 20:1 is attained, although it will be appreciated, of course, that this reflux ratio is merely one which we have found to have given good results, and our invention is not restricted to any particular reflux ratio. By reflux ratio is meant the ratio of amount of condensate returned to the still to the amount of vapor removed at the top of the column.

We have found it advantageous in many circumstances to separate the distillate into seven or more fractions, collecting each fraction of the distilled product separately. Of course such separating of the distillate into separate fractions is not essential, but has been found advantageous in grading and separating in accordance with color the resulting product. Thus, for example, the first three fractions may each consist of 15% of the total quantity of liquid distilled, while each of the remaining four fractions may contain 10% of the total.

In decolorizing crude acid without fractional distillation of the mixture, we have observed that the use of relatively larger amounts of the monoper- acid will give faster results than those amounts necessary for rapid clarification when fractional distillation is practiced. However, we do not wish to specify any necessary percentage of monoper- acid, as the percentage necessary will naturally depend on the color of the crude acid being clarified and the relative activity of the particular monoper- acid selected. If the crude acid being decolorized is relatively light in color at the start, and it is desired merely to convert it to the water-white variety, efficient and rapid clarification will frequently be obtained with relatively small amounts of the monoper- acid. For dark colored products, especially products obtained in the pyroligneous acid manufacturing process, greater amounts of the monoperacid may be necessary. It should be emphasized, however, that our process is capable of being carried out with widely different percentages of the monoper- acid in the crude acid and is, moreover, capable of being carried out at ordinary room temperatures as well as at elevated temperatures. Thus, it may be desirable in some instances to allow the mixture of crude acid to be decolorized and monoper- acid to stand at a temperature above room temperature, even at a relatively high temperature, for a period of time necessary to secure the desired clarification. It may be noted that, in general, with equal amounts of active agent, better and more rapid decolorization is attained at elevated temperatures than at lower temperatures.

Among the monoper- acids found to be particularly advantageous in our process may be mentioned monoperacetic acid, monoperphthalic acid, monoperbenzoic acid, monopersuccinic acid, and monopersulfuric acid (Caro's acid). When decolorizing crude acetic acid the use of monoperacetic acid is particularly advantageous as, after yielding up its active oxygen content during the decolorization step, the monoperacetic acid is converted into acetic acid, which does not constitute a foreign material in the final product. However, the selection of a particular monoper- acid will depend largely on the character of the crude acid to be decolorized, the availability of the monoper- acid, the rapidity and the degree of decolorization desired, and on other factors apparent to those skilled in the art. It should here be noted that we do not intend in any way to limit the monoper- acid suitable for use in our process by reference above to the particular monoper- acids found most advantageous under some circumstances, as other monoper- acids may be found to be of greater efficiency when utilized under other circumstances and for treating products of different characters.

As examples of our improved process the following may be given:

*Example I*

10 pounds of crude acetic acid manufactured by a process involving a solvent extraction step were added to 0.1 pound of peracetic acid. The mixture of crude acetic acid containing approximately 1% of peracetic acid was then subjected to distillation over a period of fifteen hours, utilizing a packed reflux column four feet in length and filled with broken glass. The reflux ration was approximately 20:1, one part of the distillate being removed for twenty parts returned to the still. The distillate was separated into seven fractions, the first three fractions each containing 15% of the total product, while each of the four remaining fractions of the distillate contained 10% of the total.

For purposes of comparison, the same crude acid was distilled without any addition agent, and also distilled with 1% of potassium permanganate added. In each case the same conditions were maintained, utilizing the same reflux column and reflux ratio. The distillate in each instance was split into seven fractions, the first three containing 15% each of the total, while the remaining four fractions contained 10% of the total.

In order to secure a comparison between the decolorizing and clarification effect of the monoper- acid added and that of potassium permanganate, the color of the fraction was observed in each instance and determined by comparison with Saybolt color standards. The results are tabulated below:

| Fraction number | Saybolt color of crude acid distilled with no decolorizing agent present | Saybolt color of fraction distilled in the presence of potassium permanganate | Saybolt color of fraction distilled in the presence of a monoper- acid (peracetic acid) |
| --- | --- | --- | --- |
| 1 |    |    | 19 |
| 2 | 8  | 11 | 17 |
| 3 |    | 9  | 23 |
| 4 | 11 | 13 | 23 |
| 5 | 15 | 17 | 22 |
| 6 | 17 | 17 | 22 |
| 7 | 17 | 11 | 22 |

Those fractions for which no value is given above are fractions which were too dark to permit determination of the color by this method. It will be noted that in every instance the color was much lighter when the sample containing the monoper- acid was distilled the higher numbers on the Saybolt scale indicating, of course, lighter colors.

It may also be noted that in the case of the fractions obtained by distillation in the presence of peracetic acid, the last four fractions were substantially water-white in color, whereas comparable fractions distilled in the presence of potassium permanganate or with no addition agent were much darker, approximately a straw color. The second and third fractions of the sample of crude acid which had been distilled in the presence of peracetic acid were much lighter in color than comparable fractions obtained by other treatments, and were at least equal to, if not superior, in color to the best fractions distilled either without the presence of an addition agent or in the presence of potassium permanganate.

*Example II*

To 100 grams of off-color acetic acid was added one gram of monopersulfuric acid and the mixture permitted to stand at room temperature. The color of the crude acid changed immediately from straw to water-white.

*Example III*

To 100 grams of an off-color acetic acid obtained by fractional distillation of crude acid there was added one gram of peracetic acid at room temperature. The color of the acetic acid turned immediately from straw to water-white.

*Example IV*

To 100 grams of a relatively dark colored crude acetic acid secured through the pyroligneous acid manufacturing method, there was added 0.05 gram of peracetic acid. The mixture was heated to a temperature of 120° F. by means of a water bath and allowed to stand for approximately one hour. At the end of that time the dark colored crude acid had turned to a light straw color. Upon further treatment at room temperature with further amounts of peracetic acid the major portion of this straw colored acid was converted to a water-white color.

*Example V*

The distillation process described in connection with Example I was repeated, using in place of 0.1 pound of peracetic acid the same amounts of the following monoper- acids:

Monoperphthalic acid
Monoperbenzoic acid
Monopersuccinic acid
Monoperphosphoric acid The distillate was separated into seven fractions, as described in that example. In each instance the color of these fractions was substantially improved, even the early portions of the distillate being practically water-white in color. The relatively darker fractions of the distillate, those approaching a straw color, were further treated by the addition of 0.05 pound of the same monoperacid at room temperature, and this darker colored acid was converted substantially immediately to acid of the desired water-white variety.

*Example VI*

To a dark colored crude acetic acid which had been previously treated by means of a solvent extraction step, approximately 10% by weight of monoperbenzoic acid was added, the mixture being maintained at room temperature. A substantial lightening in color was immediately observed, and at the end of a few moments the product had been converted substantially entirely to a product of a light straw color. Further treatment with additional amounts of the monoperacid, or merely further standing at room temperature, resulted in a product of the desired water-white color.

*Example VII*

To a dark colored crude acetic acid which had been previously prepared by means of a solvent extraction step, sufficient of a solution of hydrogen peroxide and of acetic anhydride were added to form in situ in the crude acetic acid approximately 1% by weight, based on the weight of the crude acid, of monoperacetic acid. The mixture was allowed to stand at room temperature and, after a very few minutes, it had been converted to practically a crystal-clear product.

*Example VIII*

To a dark colored crude acetic acid which had been previously treated by means of a solvent extraction step, succinic anhydride and hydrogen peroxide solution were added in sufficient amount to form approximately 1% by weight of monopersuccinic acid in the crude acetic acid. The mixture, standing at room temperature, was seen to lighten in color substantially immediately, and at the end of a few moments the entire product had been converted substantially entirely to a light straw color. Further treatment with additional amounts of hydrogen peroxide and succinic anhydride, yielding monopersuccinic acid in the crude acid, was sufficient to convert all of the product to the desired water-white color.

*Example IX*

The treatment of the crude acetic acid of Example I was repeated exactly as explained in that example except that the monoperacetic acid, instead of being prepared outside of the crude acid and added thereto, was prepared in situ in the crude acid by adding thereto sufficient acetic anhydride and sufficient hydrogen peroxide solution to form the desired quantity (about 1%) of monoperacetic acid in the crude product. Upon distillation and separation of the distillate into fractions substantially the same results were observed for lightening in color as those given in Example I.

It is to be understood that the various amounts and procedures previously described as illustrative are not to be regarded as restrictive. The invention is of broad general application in the decolorization of crude acids of varying degrees of purification. The crude acid may be derived from any source whatever. Thus, it may be prepared by solvent extraction from acidic products prepared by the pyroligneous distillation process to yield, after removal of the solvent, crude acetic acid, or it may be secured from other sources.

Various changes may be made in the procedure disclosed which would still fall within the scope of our invention and which would utilize the essential element thereof, the use of monoper- acids for the decolorization of crude acetic acid. The scope of the invention is to be determined in accordance with the prior art and the appended claims, as various equivalents of the disclosed steps and procedures might be utilized which would come within the purview of our invention.

We claim:

1. A process for clarifying crude acetic acid secured from pyroligneous acid in order to free it of dark colored impurities present therein which comprises treating said crude acid with from 0.01% to 10% by weight of monoper- acid, said percentages being by weight, based on the weight of the crude acid.

2. A process for clarifying crude acetic acid prepared by solvent extraction from pyroligneous acid to free it of dark colored impurities present therein, which comprises treating said crude acetic acid with a monoper- acid in amount sufficient to effect clarification thereof.

3. A process of decolorizing crude acetic acid which has been prepared by solvent extraction of pyroligneous acid to free it of dark colored impurities present therein, which process involves adding a monoper- acid to said crude acid in amounts ranging from 0.01% to 10% by weight, based on the weight of the crude acid, and permitting said mixture to stand until said crude acid has been decolorized to the desired extent.

4. A process for decolorizing crude acetic acid secured from pyroligenous acid in order to free it of dark colored impurities present therein which comprises preparing a mixture of crude acetic acid and a monoper- acid and subjecting that mixture to an elevated temperature under reflux conditions for a period of time sufficient to effect the desired decolorization.

5. A process as defined in claim 4, wherein the monoper- acid is present in amounts ranging from 0.01% to 10%, based on the weight of the crude acid.

6. A process for decolorizing crude acetic acid secured from pyroligneous acid in order to free it of dark colored impurities present therein which comprises treating said crude acid with a monoper- acid selected from the group which consists of monoperacetic acid, monopersuccinic acid, monoperphthalic acid, monoperbenzoic acid, monopersulfuric acid, and monoperphosphoric acid, said monoper- acid being present in amount sufficient to bring about the desired decolorization of said crude acid.

7. A process for decolorizing crude acetic acid secured from pyroligneous acid in order to free it of dark colored impurities present therein which comprises treating said crude acetic acid with a monoper- acid selected from the group which consists of monoperacetic acid, monopersuccinic acid, monoperphthalic acid, monoperbenzoic acid, monopersulfuric acid, and monoperphosphoric acid, said monoper- acid being present in amounts ranging from 0.01% to 10% by weight, based on the weight of said crude acid.

8. A process for decolorizing crude acetic acid secured from pyroligneous acid in order to free it of dark colored impurities present therein which comprises subjecting a mixture of said crude acetic acid and a monoper- acid selected from the group which consists of monoperacetic acid, monopersuccinic acid monoperphthalic acid, monoperbenzoic acid, monopersulfuric acid, and monoperphosphoric acid, to an elevated temperature under reflux conditions for a period of time sufficient to effect the desired decolorization.

9. A process for decolorizing crude acetic acid secured from pyroligneous acid in order to free it of dark colored impurities present therein which comprises introducing into said crude acetic acid reagents which will react in said crude acetic acid to form a monoper- acid selected from the group which consists of monoperacetic acid, monopersuccinic acid, monoperphthalic acid, monoperbenzoic acid, monopersulfuric acid, and monoperphosphoric acid, and subjecting said mixture of crude acetic acid and the resulting monoper- acid to an elevated temperature under reflux conditions for a period of time sufficient to effect the desired decolorization.

10. A process for decolorizing crude acetic acid secured from pyroligneous acid in order to free it of dark colored impurities present therein which comprises subjecting said crude acetic acid to the action of monoperacetic acid in amount sufficient to decolorize said crude acetic acid.

11. A process for decolorizing crude acetic acid secured from pyroligneous acid in order to free it of dark colored impurities present therein which comprises subjecting said crude acetic acid to the action of monopersulfuric acid in amount sufficient to decolorize said crude acid.

12. A process for decolorizing crude acetic acid secured from pyroligneous acid in order to free it of dark colored impurities present therein which comprises subjecting said crude acetic acid to the action of monopersuccinic acid in amount sufficient to decolorize said crude acid.

JOSEPH S. REICHERT.
ARTHUR ALEXANDER ELSTON.
ROY ARTHUR SECORD.